United States Patent [19]

Peterson et al.

[11] 4,358,698
[45] Nov. 9, 1982

[54] ROTOR CONSTRUCTION FOR DYNAMOELECTRIC MACHINES APPARATUS

[75] Inventors: Gary M. Peterson, Merrill; Andrew J. Smiltneek, Menasha, both of Wis.

[73] Assignee: Marathon Electric Corporation, Wausau, Wis.

[21] Appl. No.: 103,469

[22] Filed: Dec. 14, 1979

[51] Int. Cl.³ .............................................. H02K 9/00
[52] U.S. Cl. .................................. 310/187; 310/269; 310/58; 310/60 A
[58] Field of Search ................ 310/52, 60 A, 61, 269, 310/63, 58, 62, 184, 186, 187, 65, 208, 217, 218, 260, 269

[56] References Cited

U.S. PATENT DOCUMENTS

| 270,781 | 1/1883 | Freeman | 310/60 A |
| 3,106,654 | 1/1959 | Wesolowski | 310/61 |
| 3,463,952 | 4/1966 | Norris | 310/61 |
| 4,182,966 | 1/1980 | Mishra et al. | 310/269 |
| 4,306,165 | 12/1981 | Kitabayashi et al. | 310/59 |

Primary Examiner—A. T. Grimley
Assistant Examiner—D. L. Rebsch
Attorney, Agent, or Firm—Andrus, Sceales, Starke & Sawall

[57] ABSTRACT

A Salient pole generator includes a laminated rotor having an integral amortisseur winding and end supports. The rotor laminations have amortisseur winding and clamping openings adjacent the shaft portion of the poles. The end supports are cast to the stack of lamination as an inverted U-shaped member aligned with each pole. Each member has an outer amortisseur winding base portion and a pair of inwardly projecting side arms. The outer base portion includes integral coil support and fan projections and an inner inclined interior wall. The coil is wound about the pole, and the support side arms, and defines a radial air slot between the end pole lamination and the interior of the coil. The air slot has the inlet opening at the shaft and an inclined discharge opening at the outer end of the winding. The fan projections promote the movement of air through the slot and thus, over the backside of the winding and the end faces of the poles.

4 Claims, 4 Drawing Figures

ROTOR CONSTRUCTION FOR DYNAMOELECTRIC MACHINES APPARATUS

BACKGROUND OF THE INVENTION

The present invention relates to a dynamoelectric machine and particularly to the construction of a rotor having an integral cooling means.

Dynamoelectric machines are highly developed devices and which generally include a fixed stator supporting a suitable field winding and a rotor carrying an armature winding. A generator for producing an alternating and particularly three phase alternating current output may be of a rotating field construction in which a main salient pole field and small brushless exciter for providing DC current to the main field are mounted as the rotor within a stator having a polyphase output winding. In the salient pole system, the rotor includes a plurality of poles each of which carries a field winding which is series or parallel connected with the other field windings. A particularly satisfactory rotor structure is manufactured and sold by Marathon Electric of Wausau, Wisconsin, in which the rotor amortisseur winding and coil support is die cast as an integral part of the rotating field rotor. Thus, the four poles are formed from one piece laminations with appropriate amortisseur winding and clamping openings, and the end rings and amortisseur winding is integrally formed of a die cast aluminum resulting in high mechanical integrity and low vibration at operating speeds. The rotor pole assembly is then heat shrunk and keyed to the support shaft. The field windings are wound on the poles with suitable pole insulation.

In such generators and like dynamoelectric machines cooling is required to prevent overheating of the windings which must be maintained during operation within a maximum safe operating temperature. Generally, fan means are coupled to the shaft to establish an air flow through the generator and thus over the stator and rotor surfaces, particularly the main field winding structure. It is important that efficient cooling be created, with the air distributed more or less evenly over the field surface and with minimal recirculation of hot air. Although various cooling systems have been suggested, they have generally provided a flow-through pattern relying on a high volume movement over the component parts to establish the effective cooling of the winding.

SUMMARY OF THE INVENTION

The present invention is particularly directed to an improved ventilation system for dynamoelectric machines and particularly for salient pole generators or synchronous motors and the like. Generally, in accordance with the teaching of the present invention, the rotor is formed with an integrated end ring structure having radially directed air slots or passageways formed by the end ring structure to effectively cool the internal surfaces of the winding and pole structure. In the preferred salient pole generator rotor, the winding is placed on the salient pole to form part of a radial slot, and thereby defining an internal cooling passageway having an air inlet and an outlet adjacent the opposite portions of the winding. Fan blades are preferably integrally cast to the end rings to promote the movement of air through the slot and thus, over the internal surface or backside of the winding and the end faces of the poles. The fan blades are preferably formed to further function as the outer coil supports and as heat sinks for cooling of the rotor core or poles.

In a preferred construction, a separate end ring portion is cast in alignment with each pole. The end ring portion is formed as an inverted U-shaped member with an outer amortisseur winding base portion and a pair of inwardly projecting legs. The outer base portion includes integral coil support and fan projections and an inner inclined interior wall. With the coil or winding in place, the pole, end ring legs and coil define an air slot having an inlet opening at the shaft and an inclined discharge opening at the outer end of the winding. The inclined wall minimizes the tendency for dust to accumulate within the slot.

Applicants have found that the present invention provides a highly effective and efficient cooling of a dynamoelectric machine winding and particularly the main field of a salient pole generator.

DESCRIPTION OF THE DRAWING FIGURES

The drawing furnished herewith illustrates a preferred construction of the present invention in which the above advantages and features are clearly disclosed as well as others which will be readily understood from the following description.

In the drawing:

FIG. 1 is an elevational view of a salient pole generator with parts broken away and sectioned to show certain details of construction;

FIG. 2 is an enlarged end view of the generator rotor taken generally on line 2—2 of FIG. 1 and with parts broken away and sectioned to show the salient pole rotor structure for illustrating a construction in accordance with the present invention on line 2—2 of FIG. 1; and FIG. 3 is a fragmentary axial section taken generally on line 3—3 of FIG. 2 through one pole of the generator rotor.

FIG. 4 is a break away perspective view of a salient pole assembly.

DESCRIPTION OF THE PREFERRED EMBODIMENT

Figure 1:
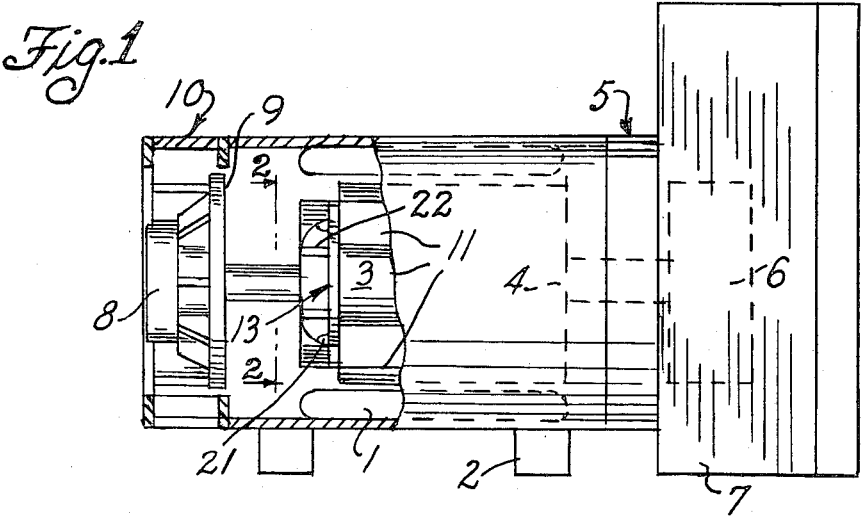
Figure 2:
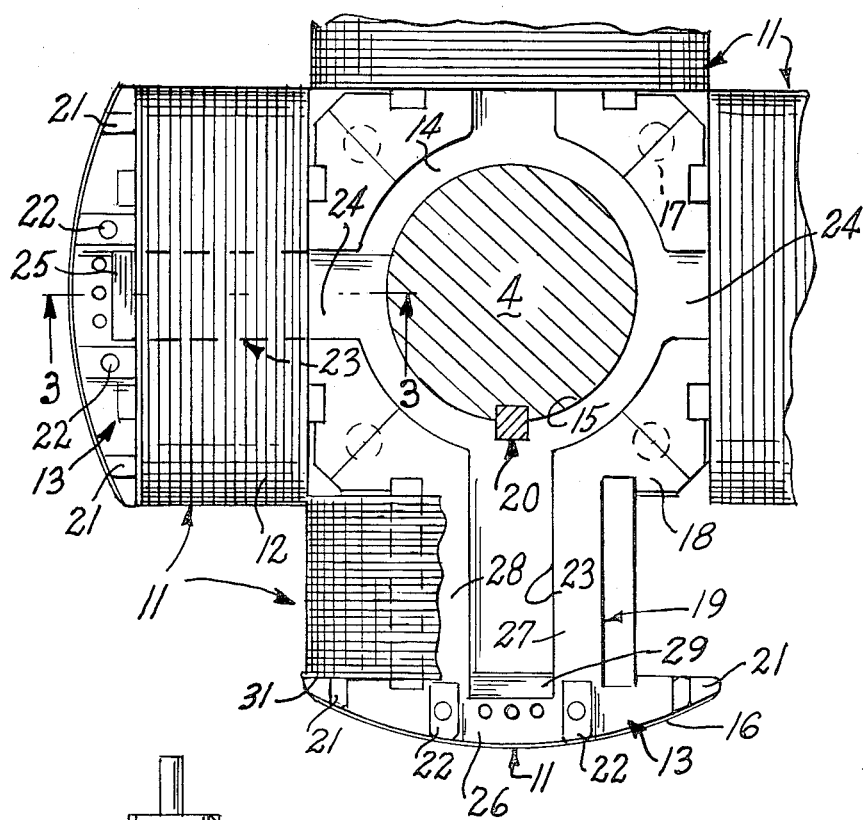

Referring to the drawing and particularly to FIG. 1, an embodiment of the invention is shown in a salient pole A.C. generator having an annular stator 1 with suitable feet 2. A salient pole rotor unit 3 is rotatably mounted within the annular stator 1. The rotor unit 3 is shown as a single bearing structure having the rotor shaft 4 journaled in the front stator end bracket 5. An A.C. Exciter 6 is secured to the shaft 4 outboard of end bracket 5. A control box 7 is secured to the front end bracket 5 of the stator 1. The box 7 encloses the exciter 6 and provides for a connection of the A.C. output power in accordance with any well-known construction. The opposite end of the shaft 4 is provided with a driven input disc unit 8 which is adapted to be connected directly to a fly wheel or the like, not shown, for rotating of the rotor 3 within the stator 1. A fan unit 9 is secured to the shaft 4 between the disc unit 8 and the end of the rotor unit 3 and is located within an S.A.E. adaptor 10 secured to the aft end of stator 1. The fan unit 9 provides a conventional axial air flow through the generator.

The present invention is particularly directed to the construction of the salient pole rotor unit 3 and consequently no further description of the other generator components is given because they will be readily understood and provided by those skilled in the art.

The salient pole rotor unit 3 is shown as a four pole unit having four equicircumferentially distributed radial poles 11 with a field winding 12 similarly wound on each pole. The several poles 11 are shown formed of a stack of one piece laminations of suitable magnetic material, with die cast end rings 13, providing an amortisseur winding and coil supports secured to the opposite end faces of the rotor.

Each pole lamination is similarly constructed with a common integral central mounting portion 14 having a shaft opening 15. Each pole 11 projects radially outwardly from one side of the mounting portion 14 and terminates in an outer winding retaining end member 16. The pole 11 has a width less than that of the mounting portion 14 and end member 16. The outer surface of each end member 16 is shaped in the usual manner to complement the annular stator 1. The outer end members 16 and the corners of the mounting portions 14 of the laminations are provided with openings 17 which in the lamination stack define axially extending openings. The laminations with the openings aligned are integrally diecast with the end rings 13. The end ring 13 may be formed of aluminum which fills the several openings to form an amortisseur winding as well as to firmly clamp the laminations in place. The end ring 13 is formed with a common center 18 and four pole portions 19 being aligned one with each of the rotor poles 11 to fully support the laminations. The die cast pole assembly is suitably secured to the shaft 4 as by being heated and then heat shrunk to the shaft and is further locked thereto as by a suitable keyed connection 20. Thus, the key connection 20 may in accordance with known structure include an elongated key of a rectangular cross section which mates with corresponding recesses in the shaft 4 and the center portion 14 of the pole assembly 3. This structure provides a rigid rotating assembly or rotor unit.

The winding or coil 12 is wound on each of the rotor poles 11 of the rotor-pole assembly. Each coil 12 is, of course, a multiple turn coil which extends over substantially the complete length of the projecting pole portion between the mounting portion 14 and the outer end face member 16. The end ring 13 is also formed with integral axially-extended coil retaining projections or supports 21 and 22 secured to the pole portion 19 and aligned with each pole 11. Relatively short supports 21 are provided adjacent each of the opposite ends of the base 26 and somewhat longer projections or supports 22 are provided therebetween to extend outwardly over the corresponding end turns of the coil 12. The side turns of each coil 12 generally lay beneath the end member 16 of each pole 11 and are securely locked in position. Thus under operating conditions the centrifugal force on the coil 12 tend to move the coil turns outwardly of the pole 11. Coil supports 21-22 and the outer end member 16 serve to hold the coil 21 in position.

In accordance with a teaching of the present invention, each pole portion 19 is specially formed to form a radially directed air slot 23 which is covered by the winding 12 on that pole. The radial length of the slot 23 is slightly greater than the radial length of the winding 12 to define slot openings 24 and 25 to the opposite ends of the winding 12.

Thus, the end openings 24 and 25 define an air circulating path permitting air flow, as shown at 25a, radially through the end ring member 19 and in the illustrated embodiment directly behind the winding 12 and the end face lamination of the rotor pole 11. The inner most opening 24 adjacent to the shaft 4 defines an air inlet opening while the outer opening 25 adjacent the outer surface of the winding 12 defines an exit or discharge opening. In the illustrated embodiment of the invention, coil supports 22 are shaped to form fan blades which improves air flow through the slot.

Figure 3:
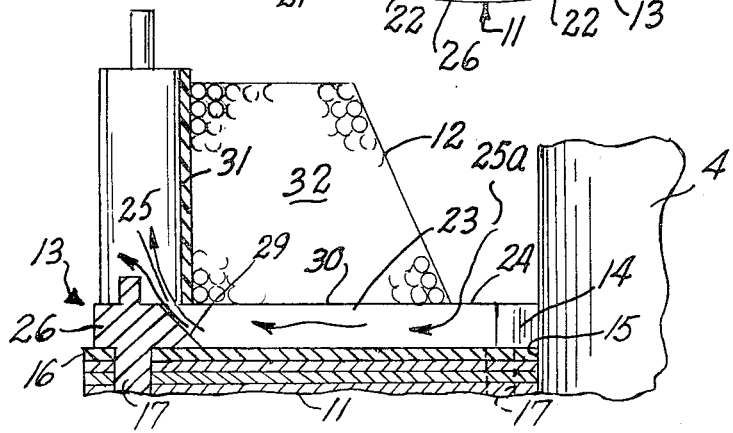
Figure 4:
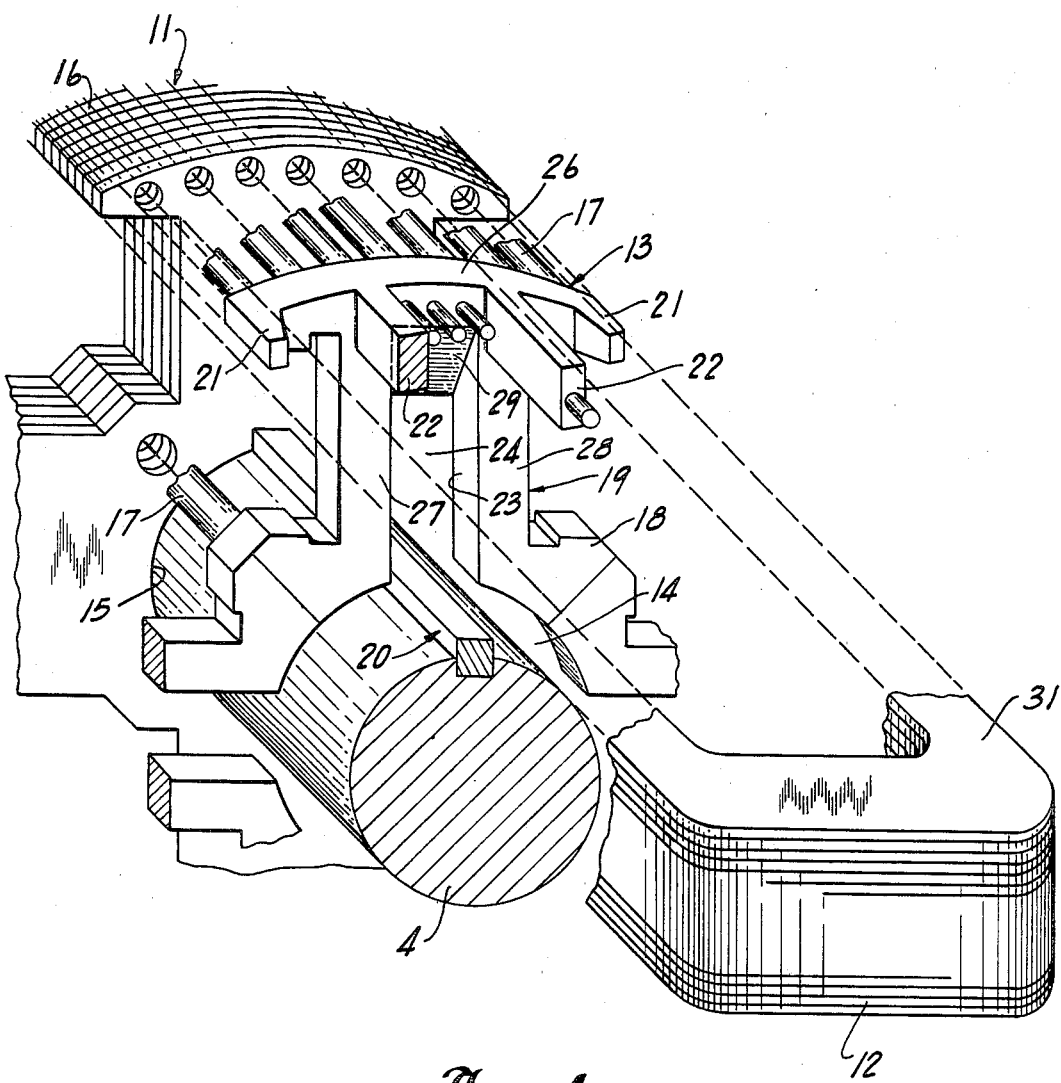

More particularly, as illustrated in FIG. 3 the end rings 13 which are integrally cast to the opposite ends of the laminations includes the pole portions 19 cast as inwardly opening rectangular U-shaped members. The pole clamp portion 19 has a width slightly smaller but generally complementing the end face of pole 11. The base 26 of portion 19 is formed by the outer ring which generally conforms to the end member 16 of the pole 11, and which includes the amortisseur winding and the coil supports 21-22. The side arms 27 and 28 of the pole portion 19 extend inwardly from the base 26 to the integral central mounting corners 18 adjacent the central mounting portion 14 of the rotor laminations.

The inner wall 29 of the outer base 26 is inclined or angled to extend from the axial outermost face edge axially and radially inwardly to the end lamination of the pole 11 as shown most clearly in FIG. 3. The outer edge of inclined wall 29 is located outwardly of the coil 12 and in the illustrated embodiment extends behind the coil assembly.

Each coil 12 is similarly constructed and includes an inner insulating sheet 30 which is wrapped about the winding pole 11 and the side arms 27-28 of the pole portions 19. An outer relatively heavy protective insulating end plate 31 abuts the underside of the pole member 16 and the coil supports 21-22 of the end ring 13. The winding 12 is a multiple turn winding which is suitably mechanically or hand wound about the pole 11 including the integral side arms 27-28. The winding insulation sheet defines a closure wall over the side arms 27-28 for the radial length of the winding to form the passageway or slot 23. The slot 23 extends radially inwardly of the coil 12 between the inner ends of the arms 27-28 common the corners 18 and also outwardly of coil 12 into the base portion 26. This thus defines the slot extending directly between the interior surface of the winding and the outer end face lamination of the rotor pole 11.

The coil supports 22 are specially formed to define fan blades which promote the movement of air radially outwardly through the slots and thereby establish a highly effective cooling air flow over the inner face of the winding and the end face of the pole for effective cooling of the winding.

During the operation of the generator, a continuous flow of air is thereby established through each pole cooling slot to maintain a highly effective and efficient cooling of the field winding. The improved cooling ensures operation at a higher rated load without exceeding the operating temperature limit of the windings and the winding insulation.

The present invention has been particularly used in generators of 125 kw and larger for the effective cooling of the field winding. The die cast end support structure with the integrated cooling passageway is a low cost construction which maintains the necessary integrity of the rotor structure in such large machines.

Although shown in a preferred construction, various modifications may be made within the teaching of the present invention which is particularly directed to the shaping of the end rings adjacent the poles to define cooling passageways. For example, the discharge opening of the slot may be located completely outwardly of the coil, and the air slots may only be provided adjacent one end of the rotor. The invention may also be applied to other generator and motor constructions. For example, the rotor may be formed as segmented rotor lamination or as a consequent pole rotor. These and other modifications depending on the particular machine design and the like can be readily provided by those skilled in the art and no further description thereof is given.

Various modes in carrying out the invention are contemplated as being within the scope of the following claims, particularly pointing out and distinctly claiming the subject matter which is regarded as the invention.

We claim:

1. A salient pole rotor for a dynamoelectric machine having a plurality of circumferentially distributed rotor poles, diecast end support members integrally cast to the opposite axial ends of said rotor poles, separate electrical coils wound on said poles to form an operative pole unit, and at least one of said support members being cast extending over the axial end of each pole and extending beyond the opposite ends of the coil thereon and having spaced side arm members defining a radially extended passageway through said pole unit to cool the interior of the coil and the end of the pole, said end support members including an outer amortisseur winding portion extending circumferentially over the outer end of the pole and having said spaced side arm members integrally cast to said winding portion abutting the end of the rotor pole and defining said passageway therebetween, said coils being wound over said side arm members and defining said passageway between the interior of the coil and the end pole lamination and said two clamp side arm members, said amortisseur winding portion being spaced outwardly of the coil to form an exit opening from said passageway.

2. The rotor of claim 1 including fan members integrally cast with said outer amortisseur winding portion in circumferentially spaced relation to said arm members to establish a forced air flow through said passageways.

3. The rotor of claim 1 wherein said amortisseur winding portion includes an inner circumferential wall forming the radially outer wall of the passageway opening, said circumferential wall being inclined from the axial outer end radially inwardly to direct the air outwardly of said passageway.

4. The salient pole rotor of claim 1 wherein said side portions of adjacent poles are interconnected at the radially inner end by integral cast portions adjacent the shaft mounting portion.

* * * * *